United States Patent
Kershaw et al.

(10) Patent No.: US 10,691,303 B2
(45) Date of Patent: Jun. 23, 2020

(54) IMMERSIVE VIRTUAL ENVIRONMENT (IVE) TOOLS AND ARCHITECTURE

(71) Applicant: Cubic Corporation, San Diego, CA (US)

(72) Inventors: Kathleen Kershaw, Orlando, FL (US); Brian Hinken, Winter Park, FL (US); Nicholas Kemner, Winter Park, FL (US); Katelyn Procci, Orlando, FL (US); Andre Balta, Orlando, FL (US); Etienne Magnin, Orlando, FL (US); Shawn Fiore, Clermont, FL (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 16/128,244

(22) Filed: Sep. 11, 2018

(65) Prior Publication Data
US 2019/0079643 A1    Mar. 14, 2019

Related U.S. Application Data

(60) Provisional application No. 62/556,750, filed on Sep. 11, 2017.

(51) Int. Cl.
*G06F 3/0482* (2013.01)
*G09B 5/02* (2006.01)
(Continued)

(52) U.S. Cl.
CPC .......... *G06F 3/0482* (2013.01); *G06F 3/0486* (2013.01); *G06F 9/451* (2018.02);
(Continued)

(58) Field of Classification Search
CPC .... G06F 3/0482; G06F 9/451; G06F 16/2228; G06F 3/0486; G06F 17/30321;
(Continued)

(56) References Cited

U.S. PATENT DOCUMENTS 6,058,397 A    5/2000  Barrus et al.
6,518,989 B1 *  2/2003  Ishikawa ................. G06T 19/00
                                                    715/757
(Continued)

OTHER PUBLICATIONS

International Search Report and Written Opinion dated Dec. 5, 2018 for International Patent Application No. PCT-US2018-050476 filed Sep. 11, 2018, all pages.
(Continued)

*Primary Examiner* — Ajay M Bhatia
*Assistant Examiner* — Phoebe X Pan
(74) *Attorney, Agent, or Firm* — Kilpatrick Townsend & Stockton, LLP

(57) ABSTRACT

A suite of tools for creating an Immersive Virtual Environment (IVE) comprises multiple software applications having multiple respective user interfaces that can each interface with a centralized database to design and develop immersive content for a game-based learning product in an IVE. According to some embodiments, this data-driven IVE production process may utilize tools having a "picker"-type selection in which selection menus are populated directly from database data, helping reduce data duplication, simplify tool design, and streamline the IVE production process.

18 Claims, 11 Drawing Sheets

(51) Int. Cl.
*G06Q 10/10* (2012.01)
*G06F 9/451* (2018.01)
*G06F 16/22* (2019.01)
*G06F 3/0486* (2013.01)
*G09B 9/00* (2006.01)
*G06F 3/0481* (2013.01)

(52) U.S. Cl.
CPC ....... *G06F 16/2228* (2019.01); *G06Q 10/101* (2013.01); *G09B 5/02* (2013.01); *G09B 9/00* (2013.01); *G06F 3/04817* (2013.01)

(58) Field of Classification Search
CPC ....... G06F 3/04817; G06F 3/011; G09B 9/00; G06T 19/006; G06T 2219/024; G06T 2210/61; G09G 2370/022; G06K 9/00671; A63F 2300/6009
See application file for complete search history.

(56) References Cited

U.S. PATENT DOCUMENTS

| | | | |
|---|---|---|---|
| 8,966,436 B2* | 2/2015 | Pryhuber | G06F 9/44505 717/104 |
| 9,152,393 B1* | 10/2015 | Mani | G06F 8/34 |
| 9,530,326 B1* | 12/2016 | Ramloll | G09B 5/02 |
| 9,788,905 B2* | 10/2017 | Avisar | G06T 13/20 |
| 10,102,110 B1* | 10/2018 | Kimball | G06F 11/3672 |
| 2004/0046792 A1* | 3/2004 | Coste | G09B 7/00 715/763 |
| 2005/0071137 A1* | 3/2005 | Selvaraj | G05B 17/02 703/6 |
| 2006/0105299 A1* | 5/2006 | Ferris | G09B 19/00 434/11 |
| 2006/0212821 A1* | 9/2006 | Charles | G06F 30/20 715/764 |
| 2006/0234195 A1* | 10/2006 | Grund-Pedersen | G09B 23/28 434/262 |
| 2007/0021955 A1* | 1/2007 | Tolone | G06Q 10/10 703/22 |
| 2007/0075993 A1* | 4/2007 | Nakanishi | A63F 13/10 345/419 |
| 2007/0192083 A1* | 8/2007 | Ivanov | G06F 40/205 704/1 |
| 2008/0092109 A1* | 4/2008 | Kinnucan, Jr. | G06F 8/10 717/105 |
| 2009/0099824 A1* | 4/2009 | Falash | G09B 9/00 703/8 |
| 2009/0228253 A1* | 9/2009 | Tolone | G06Q 10/10 703/6 |
| 2009/0276288 A1* | 11/2009 | Hlavac | A63F 13/10 705/14.4 |
| 2010/0049335 A1* | 2/2010 | Assarsson | G05B 19/042 700/9 |
| 2011/0231781 A1* | 9/2011 | Betzler | G06F 12/0875 715/757 |
| 2012/0123758 A1* | 5/2012 | Kevan | G06N 3/006 703/6 |
| 2012/0256954 A1* | 10/2012 | Soon-Shiong | G06T 19/006 345/633 |
| 2013/0117064 A1* | 5/2013 | Sadeghi | G06Q 10/0633 705/7.27 |
| 2013/0149684 A1* | 6/2013 | Ezzell | G09B 23/28 434/272 |
| 2014/0282013 A1* | 9/2014 | Amijee | G06F 3/0482 715/732 |
| 2014/0310595 A1* | 10/2014 | Acharya | G06F 9/453 715/706 |
| 2014/0317037 A1* | 10/2014 | Andrews | G06N 5/02 706/46 |
| 2015/0007031 A1* | 1/2015 | Kiey | G11B 27/031 715/723 |
| 2015/0050623 A1* | 2/2015 | Falash | G09B 9/24 434/38 |
| 2015/0146007 A1* | 5/2015 | Dusik | G06K 9/00671 348/161 |
| 2015/0177952 A1* | 6/2015 | Meyer | G06F 3/04842 715/739 |
| 2016/0034596 A1* | 2/2016 | Choi | H04W 4/70 707/763 |
| 2017/0052676 A1* | 2/2017 | Pulier | G06F 3/04817 |
| 2017/0151484 A1* | 6/2017 | Reilly | A63B 71/0622 |
| 2017/0213473 A1* | 7/2017 | Ribeira | G06F 19/3456 |
| 2017/0372521 A1* | 12/2017 | Jannin | G09B 9/00 |
| 2018/0021684 A1* | 1/2018 | Benedetto | G06F 17/30846 463/24 |
| 2018/0113598 A1* | 4/2018 | Linder | G05B 19/4065 |
| 2018/0345496 A1* | 12/2018 | Li | G06N 3/0445 |
| 2018/0357922 A1* | 12/2018 | Dutta | G06F 3/011 |
| 2019/0114549 A1* | 4/2019 | Olsher | G06N 5/04 |

OTHER PUBLICATIONS

International Preliminary Report on Patentability dated Mar. 26, 2020 in related application No. PCT/US2018/050476, all pgs.

* cited by examiner

FIG. 5

IMMERSIVE VIRTUAL ENVIRONMENT (IVE) TOOLS AND ARCHITECTURE

CROSS-REFERENCES TO RELATED APPLICATIONS

This application is a nonprovisional of and claims the benefit of priority to U.S. Provisional Patent Application No. 62/556,750, entitled "IMMERSIVE VIRTUAL ENVIRONMENT (IVE) TOOLS AND ARCHITECTURE," filed Sep. 11, 2017, which is incorporated by reference herein in its entirety.

BACKGROUND OF THE INVENTION

Simulation-based learning in a virtual environment allows students to learn by interacting with objects provided in a 3-D graphical visualization on a computer display, or a head-mounted display (e.g., a virtual reality (VR) headset, augmented reality (AR) headset, or the like). An Immersive Virtual Environment (IVE) is a type of virtual environment with an instructional focus that can allow students to learn via procedure-driven large-scale game-based training, and can further evaluate performance based interaction with the virtual environment. IVE-based learning is becoming increasingly popular in various applications, such as military, commercial, or industrial applications where, for example, students interact with expensive and specialized equipment or vehicles (e.g., airplanes, ships, and the like) that may not be easily accessible for training purposes.

Creating such virtual environments for IVE-based learning, however, can be highly time-consuming and expensive. This is due, at least in part, to the fact that many different tools may be used by many different users during the production process to gather information regarding various objects in the IVE, create simulation models that accurately reflect an object's different states and behavior, indicate how different objects in the IVE interact, create a "script" for the simulation to follow in order to meet various instructional criteria, and so forth. Moreover, often times it takes technical expertise to successfully utilize these tools to create an IVE.

BRIEF SUMMARY OF THE INVENTION

A suite of tools and accompanying architecture that utilizes a centralized database for storing simulation, learning content (e.g., performance and instructional content), and other data, is provided herein, which addresses these and other issues. More specifically, multiple software applications having multiple respective user interfaces can each interface with a centralized database to design and develop immersive content for a game-based learning product in an IVE. According to some embodiments, this data-driven IVE production process may utilize tools having a "picker"-type selection in which selection menus are populated directly from database data, helping reduce data duplication, simplify tool design, and streamline the IVE production process.

An example method of creating content for a virtual environment, according to the description, comprises using a first software application having a first graphical user interface to create a plurality of data structures in a database, where each data structure of the plurality of data structures corresponds to a respective interactive object in the virtual environment, and comprises one or more attributes of the respective interactive object. The method further comprises using a second software application communicatively coupled with the database and having a second graphical user interface to retrieve, from the database, at least one data structure of the plurality of data structures, create a procedural task in which a value of at least one attribute of the at least one data structure is changed, and store, in the database, the procedural task. The method also comprises using a third software application communicatively coupled with the database and having a third graphical user interface to retrieve the procedural task, create instructional content for performing the procedural task, wherein the instructional content is accessible within the virtual environment, and create an electronic file indicative of the instructional content.

Alternative embodiments of the method may comprise one or more of the following additional features. The second user interface may comprise a selectable menu populated by the one or more attributes of the at least one data structure. The method may further comprise using a fourth software application having a fourth graphical user interface to create a simulation model that defines how a first interactive object in the virtual environment interacts with a second interactive object in the virtual environment, where creating the simulation model comprises retrieving, from the database, information from respective data structures of each of the first interactive object and the second interactive object. The method may further comprise defining, for each data structure of the plurality of data structures, one or more states of the one or more attributes of the respective data structure. The method may further comprise creating an authorization profile for a user, where the authorization profile indicates whether the user is authorized to use the first software application, the second software application, or the third software application, or any combination thereof. One or more attributes of each data structure of the plurality of data structures further may comprise information indicative of a location of the respective interactive object within the virtual environment. The instructional content may comprise a flow of events, and the third graphical user interface may enable a user to create the instructional content, at least in part, by dragging an icon representative of the procedural task and placing it within a graph representative of the flow of events. The third graphical user interface further may enable a user to highlight, in the virtual environment, a respective at least one interactive object of the at least one data structure. The third graphical user interface further may enable the user to select the at least one data structure from a menu listing the plurality of data structures, and the third software application may populate the menu by retrieving, from the database, a list of the plurality of data structures. The method may further comprise using the first software application having the first graphical user interface to create a plurality of additional data structures in the database, wherein each data structure of the plurality of additional data structures corresponds to a respective additional feature of the virtual environment, each additional feature comprising a player character, a non-player character, a location, a photo reference, or a course learning objective, or any combination thereof.

An example non-transitory computer-readable medium, according to the disclosure, has instructions embedded thereon for creating content for a virtual environment. The instructions, when executed by one or more computer systems, cause the one or more computer systems to provide a first graphical user interface configured to enable the creation of a plurality of data structures in a database, where each data structure of the plurality of data structures corresponds to a respective interactive object in the virtual environment, and comprises one or more attributes of the respective interactive object. The instructions, when executed by one or more computer systems, further cause the one or more computer systems to provide a second graphical user interface configured to enable the retrieval, from the database, at least one data structure of the plurality of data structures, the creation of a procedural task in which a value of at least one attribute of the at least one data structure is changed, and the storing, in the database, the procedural task. Additionally, the instructions, when executed by one or more computer systems, cause the one or more computer systems to provide a third graphical user interface configured to enable the retrieval of the procedural task, the creation of instructional content for performing the procedural task, wherein the instructional content is accessible within the virtual environment, and the creation of an electronic file indicative of the instructional content.

Alternative embodiments of the non-transitory computer-readable medium may further comprise one or more of the following features. The second user interface may comprise a selectable menu populated by the one or more attributes of the at least one data structure. The instructions, when executed by one or more computer systems, may further cause the one or more computer systems to provide a fourth graphical user interface configured to enable the creation of a simulation model that defines how a first interactive object in the virtual environment interacts with a second interactive object in the virtual environment, wherein the creation of the simulation model comprises retrieving, from the database, information from respective data structures of each of the first interactive object and the second interactive object. The instructions, when executed by one or more computer systems, may further cause the one or more computer systems to define, for each data structure of the plurality of data structures, one or more states of the one or more attributes of the respective data structure. The instructions, when executed by one or more computer systems, may further cause the one or more computer systems to create an authorization profile for a user, where the authorization profile indicates whether the user is authorized to use the first software application, the second software application, or the third software application, or any combination thereof. One or more attributes of each data structure of the plurality of data structures may further comprise information indicative of a location of the respective interactive object within the virtual environment. The instructional content may comprise a flow of events, and the instructions, when executed by one or more computer systems, further cause the one or more computer systems to cause the third graphical user interface to enable for a user to create the instructional content, at least in part, by dragging an icon representative of the procedural task and placing it within a graph representative of the flow of events. The instructions, when executed by one or more computer systems, may further cause the one or more computer systems to cause the third graphical user interface to further enable a user to highlight, in the virtual environment, a respective at least one interactive object of the at least one data structure. The instructions, when executed by one or more computer systems, may further cause the one or more computer systems to cause the third graphical user interface to enable the user to select the at least one data structure from a menu listing the plurality of data structures, and populate the menu by retrieving, from the database, a list of the plurality of data structures. The instructions, when executed by one or more computer systems, may further cause the one or more computer systems to create, using the first graphical user interface, a plurality of additional data structures in the database, wherein each data structure of the plurality of additional data structures corresponds to a respective additional feature of the virtual environment, each additional feature comprising a player character, a non-player character, a location, a photo reference, or a course learning objective, or any combination thereof.

BRIEF DESCRIPTION OF THE DRAWINGS

For a more complete understanding of this invention, reference is now made to the following detailed description of the embodiments as illustrated in the accompanying drawings, in which like reference designations represent like features throughout the several views and wherein:

FIGS. 4-7B are screenshots of GUIs of various IVE tools provided to help illustrate aspects of the data flow of an embodiment;

In the appended figures, similar components and/or features may have the same reference label. Further, various components of the same type may be distinguished by following the reference label by a dash and a second label that distinguishes among the similar components. If only the first reference label is used in the specification, the description is applicable to any or all of the similar components having the same first reference label irrespective of the second reference label.

DETAILED DESCRIPTION OF THE INVENTION

The ensuing description provides embodiments only, and is not intended to limit the scope, applicability or configuration of the disclosure. Rather, the ensuing description of the embodiments will provide those skilled in the art with an enabling description for implementing an embodiment. It is understood that various changes may be made in the function and arrangement of elements without departing from the scope.

It can be noted that, as used herein, "virtual environment," "Immersive Virtual Environment" (IVE), "simulation," "in-game environment," and similar terms may be used interchangeably and refer to a controlled training environment in which students (end-users of the training environment) interact with a 3-D rendered virtual environment to accomplish various training objectives. (An Integrated Virtual Shipboard Environment (IVSE) is an example IVE utilized in naval training applications.) That said, it will be understood that alternative embodiments may be utilized in applications other than the training of students.

They can also be noted that, in general, the term "data structure" as used herein is meant to refer to any of a variety of types of data structures stored in a database and used by the various IVE tools described herein. As also described herein, data structures may correspond with objects, locations, features, or other aspects of the IVE that may be viewable within the IVE by students or other users.

Figure 1:
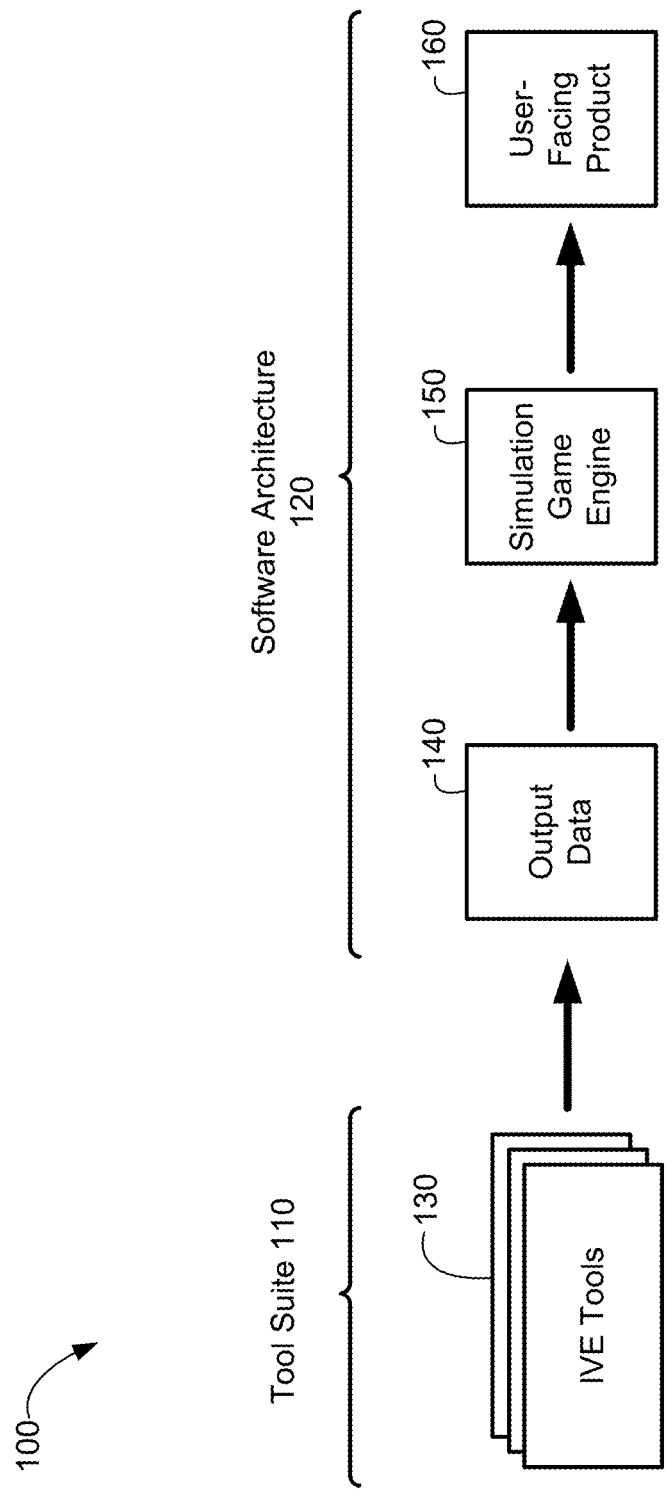
FIG. 1 is simplified block diagram of IVE tools and architecture, according to an embodiment.

FIG. 1 is a simplified block diagram of IVE tools and architecture 100, according to an embodiment. Here, the IVE tools and architecture 100 comprises a tool suite 110 and software architecture 120, which are utilized for developing procedure-driven, large-scale game-based training in realistic, immersive environments. The tool suite 110 comprises a plurality of IVE tools 130, discussed in more detail below, that generate output data 140 that is fed to the simulation game engine 150 to provide the user-facing product 160.

Generally put, the output data 140 can provide a "script" used by the simulation game engine 150 to provide the desired instructional content to students experiencing the user-facing product 160. The specific content and format of the output data 140 may vary, depending on desired functionality. In some embodiments, for example, the output data comprises a Lesson Data Package (LDP) in the form of an XML, file. The output data 140 can include, for example, a list of procedural steps a student must complete and/or instructional cues for the IVE to provide.

The simulation game engine 150 may also vary, depending on desired functionality, hardware capabilities, and other factors. In some embodiments, the simulation game engine 150 may comprise a 3-D graphics engine (e.g., CryEngine® or Unreal Engine®) used for creating a 3-D virtual environment. Artists may use production design tools (separate from the tool suite 110) to create visual features of the IVE displayed by the user-facing product 160. In some embodiments, the simulation game engine 150 may utilize one or more plug-ins to read the output data 140 at runtime.

The user facing product 160 may comprise a visualization of the 3-D virtual environment (with associated sounds), including the instructional content created by the tool suite 110. As previously noted, the visualization may be shown on a computer display and/or another display, such as a virtual reality (VR) or augmented reality (AR) head-mounted display worn by a student. Depending on desired functionality, embodiments may enable students to select instructional content from a variety of training modules (also known as training "packets" or "sessions"). These training modules may be grouped in accordance with different learning objectives, and groups of modules may form larger units, or lessons, of instruction. Accordingly, in some embodiments, the output data 140 provided by the tool suite 110 may not only dictate what is learned within a particular training module, but also an order in which various training modules within the IVE may be taken by a student.

Figure 2:
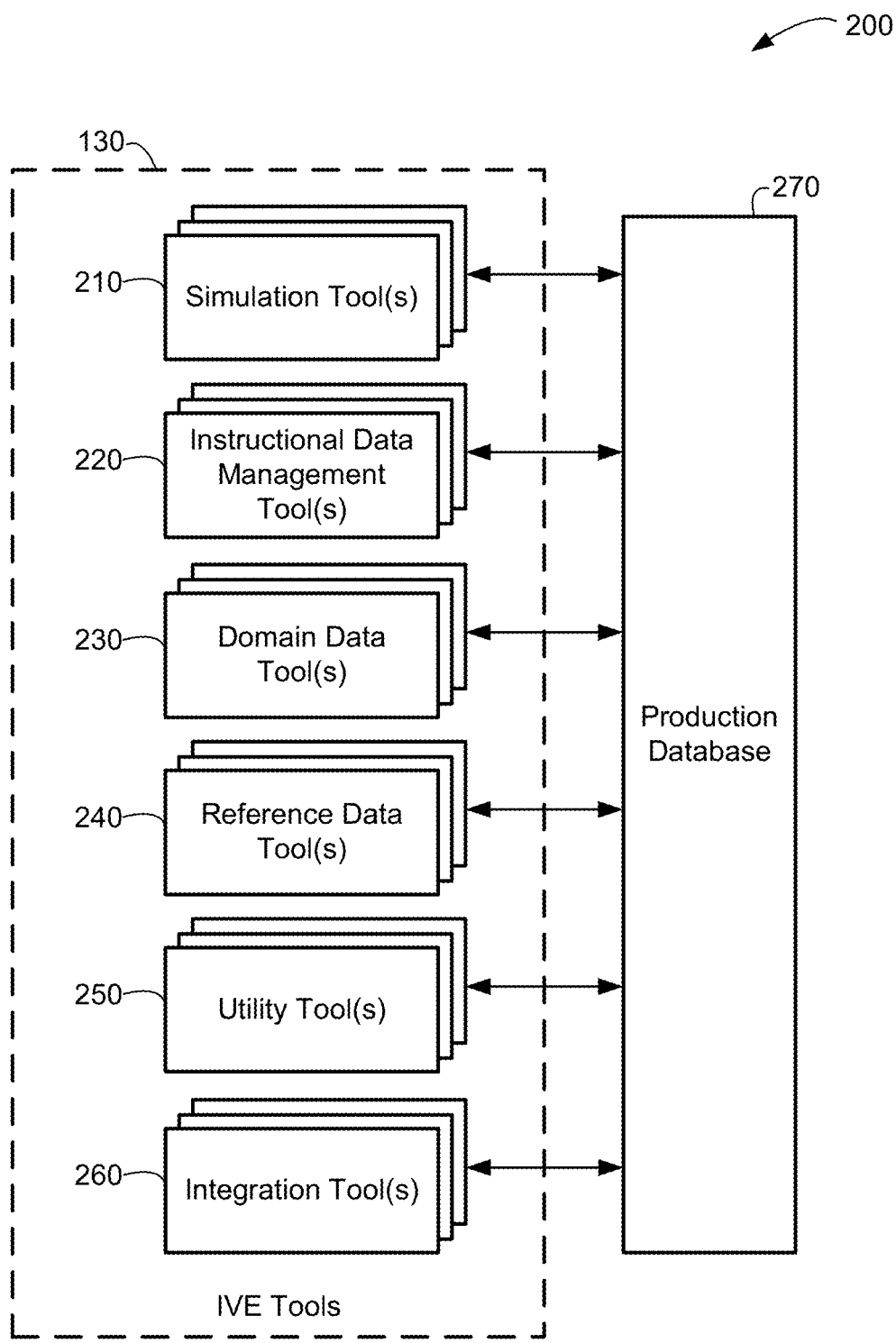
FIG. 2 is a simplified block diagram of an embodiment of IVE tools database architecture, which may correspond to the tools suite illustrated in FIG. 1.

FIG. 2 is a simplified block diagram of an embodiment of IVE tools database architecture 200, which may correspond to the tools suite 110 illustrated in FIG. 1. Here, the IVE tools 130 fall into various different categories, including one or more simulation tools 210, instructional data management tools 220, domain data tools 230, reference data tools 240, utility tools 250, and integration tools 260. As noted above, the IVE tools 130 access a centralized production database 270. It can be noted that, as with other figures provided herein, FIG. 2 is provided as a non-limiting example. Alternative embodiments may have architectures in which tool categories are added, omitted, combined, separated, or rearranged, as desired.

IVE tools 130 may comprise software applications enabling different users to work on different aspects of the IVE. As such, the IVE tools 130 may be executed on different computer systems (e.g., personal computers, servers, etc.), which may be dispersed geographically. IVE tools 130 may be executed by a personal computer local to a user using the IVE tools. Additionally or alternatively, IVE tools 130 be executed by a remote server and accessible to the user via a client application or Internet browser (e.g., via a web portal).

Because the various IVE tools 130 may be accessed by different users, the IVE tools database architecture 200 may use user accounts having different authentication profiles. That is, the IVE tools database architecture 200 may maintain a database (which may be part of the production database 270, or maybe separate) in which authentication credentials (e.g., account information such as user names, passwords, etc.) for various users are associated with different permissions for the various IVE tools 130. As such, access to different IVE tools 130 may be granted to different users. One or more users and/or entities may act as administrators to manage these user accounts and associated permissions.

As previously noted and as illustrated in more detail below, the utilization of a centralized production database 270 by the various IVE tools 130 can provide a more efficient and streamlined simulation production process over traditional techniques. This is due, at least in part, to the use of common data structures in the production database 270 by the various IVE tools 130, which can help avoid data duplication and errors.

The utility tool(s) 250 may comprise tools utilized to set up the data structures in the production database 270. As such, these may comprise backend tools used by one or more entities creating and maintaining the production database 270. In some applications, for example, an IVE producer may gather information from a customer (e.g., a military or commercial entity desiring an IVE) for and IVE project, then create the data structures stored in the production database 270 and used by IVE tools 130. IVE tools 130 can further add to these data structures over the course of the IVE production.

Generally put, the data structures of the production database 270 correspond to objects or locations within the IVE. Data structures may therefore represent components (i.e., interactive objects), locations, characters (e.g., player and non-player characters), or other objects or features within the IVE. The production database 270 may additionally include data structures for other information related to the IVE project, such as photo references, course learning objectives, and so forth. With this in mind, the nature and complexity of the data structures can vary, and may depend, at least in part, on the IVE project. In some instances, data structures may comprise data objects having one or more attributes. Data structures may further have values for the one or more attributes.

In addition to setting up the data structures in the production database 270, the utility tool(s) 250 may comprise tools used in the maintenance of the production database 270. Such tools may comprise tools capable of creating and maintaining user accounts (including associated user authentication profiles), identifying and removing redundant data, and so forth.

Reference data tool(s) 240 may comprise one or more tools used to create a flexible data repository for data related to the IVE that can be accessed at various times throughout the IVE production process by various users to inform aspects of the creation of the IVE. This reference data may comprise videos, pictures, procedural data, documents, and the like, and/or links to a location of this data, which may be gathered from any of a variety of sources (e.g., a customer, the Internet, etc.) and which may relate to the various features and objects within the IVE. The reference data can be used to indicate how an object in the IVE should look or behave, for example. As such, the reference data may be associated with the respective data structures for those features and objects stored in the production database 270, and made accessible to users of the IVE tools 130 to access or modify the respective data structures. In some embodiments, access to the reference data may be provided from within the IVE 130 tools themselves and/or within the IVE.

The domain data tool(s) 230 may comprise one or more tools that enable the editing of information in the production database 270 specific to a particular domain. As used herein, a "domain" may refer to a particular project for particular customer (e.g., a simulated ship for the Navy). As such, domain data tools may allow for editing of particular data structures within the production database 270. In some embodiments, for example, a domain data tool 230 may allow users to edit a particular type of data structure (e.g., edit attributes for a certain type of valve used in a domain comprising a simulated ship) and/or edit a particular data structure (e.g., edit values for a specific instance of the valve at a particular location on the simulated ship). By editing data structures in the production database 270 this can impact other IVE tools 130 that use these data structures.

In some embodiments, the domain data tool(s) 230 may comprise tools for encoding a procedure performed within the IVE as part of an instructional session. For example, a subject matter expert (SME) may be able to use such a domain data tool 230 to decompose a procedural document (e.g., provided by the customer) into steps the IVE can understand. For a procedure that requires interacting with a component (interactive objects) within the IVE, the domain data tool 230 can retrieve respective data structures from the production database 270 of components, and allow a user (e.g., a SME, instructional designer, or content designer) to select the component and further define a procedural task using the component. The procedural task may involve, for example, altering a state of the component (e.g., moving a switch from an "on" position to an "off" position, opening a valve, etc.), which may correspond to changing a value of an attribute of the respective data structure for the component. An example tool for encoding a procedure is described below with regard to FIG. 5.

In some embodiments, the domain data tool(s) 230 may comprise tools for defining how location data can be streamed within the IVE by the simulation game engine 150. When a student is in a given location within the IVE, the simulation game engine 150 can provide a 3-D rendering of the given location, viewable by the student via the user-facing product 160. Because nearby locations may also be viewable from the given location, the simulation game engine 150 may also render the nearby locations (and/or provide audio of the nearby locations). A domain data tool 230 that defines how location data can be streamed can allow a user to not only select the lighting, audio, and interactive content for the given location, but can also allow the user to select nearby locations (and optionally lighting, audio, etc. from those locations) that can be seen from the given location. Accordingly, such a tool can be highly desirable for optimization.

In some embodiments, the domain data tool(s) 230 may comprise tools for providing in-game simulations of computers, interactive displays, and other interactive interfaces. An example tool can, for example, enable a user to define different screens and interactive buttons in an interface in file containing HyperText Markup Language (HTML), Cascading Style Sheet (CSS) and/or JavaScript® (JS), for example, then enable the interactive buttons to trigger something (e.g., a behavior in a component) in the IVE.

The simulation tool(s) 210 may comprise one or more tools that enable the creation and editing of simulation models used to define the behavior of components (interactive objects in the IVE) and/or other items in the IVE. To define the behavior of components, for example, the simulation tool(s) 210 may retrieve data from the respective data structures of the components in the production database 270. As with other IVE tools 130, simulation tool(s) 210 may provide a user interface that enables non-technical users to create data used in the IVE production. Simulation models created by the simulation tool(s) 210 may comprise XML files used by the IVE at run time to determine an initial state for various components (and/or other items) in the IVE, how they behave, and how they interact with other components. These simulation models may be stored in the production database 270 and used by other IVE tools 130.

Figure 3A:
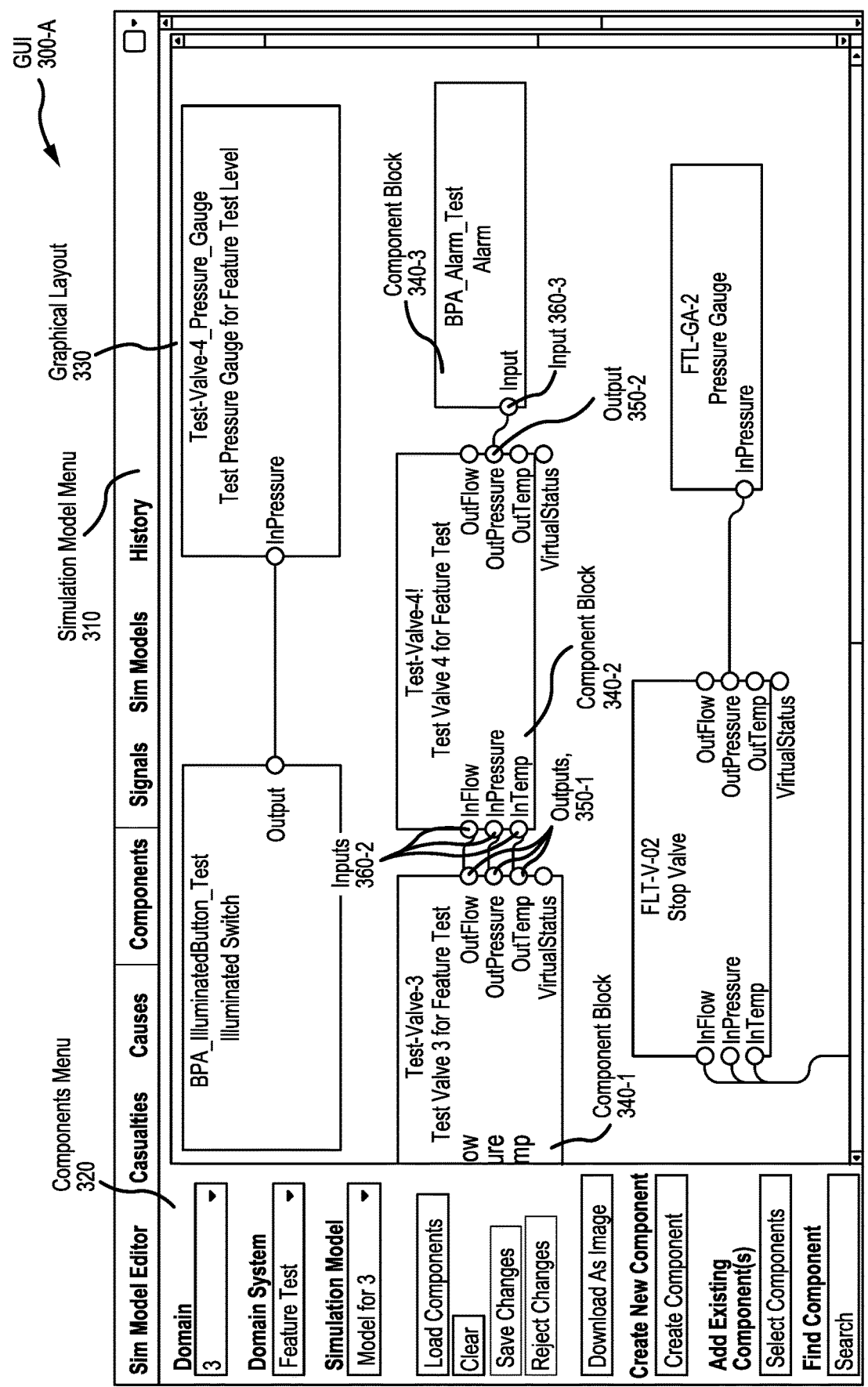
FIG. 3A is a screen capture of a graphical user interface (GUI) of a simulation tool, according to an embodiment.

FIG. 3A is a screen capture of a graphical user interface (GUI) 300-A of a simulation tool 210, according to an embodiment. Here, the GUI 300-A includes a simulation model menu 310, a components menu 320, and a graphical layout 330. (Of course, alternative embodiments of a GUI 300-A for a simulation tool 210 may include additional or alternative features.) With this GUI 300-A, a user can define the behavior of the component of an IVE by indicating how it interacts with other components.

Using the GUI 300-A, a user may define a system comprising of multiple components (interactive objects in the IVE) represented by component blocks 340-1, 340-2, and 340-3 (collectively and generically referred to herein as component blocks 340) in the graphical layout 330. (To avoid clutter, not all component blocks in FIG. 3A are labeled.) Using the components menu 320, a user can select the system to define and the components to include.

The components menu 320 may, as illustrated, enable a user to create a new component or add an existing component. If the user chooses to add an existing component, the simulation tool 210 can provide a component "picker" menu, populated with components for which corresponding data structures are found in the production database 270. If the user chooses to add a new component, the simulation tool 210 can provide a new window (or invoke a separate IVE tool 130) to create a new data structure for the component, which is saved to the production database 270.

Figure 3B:
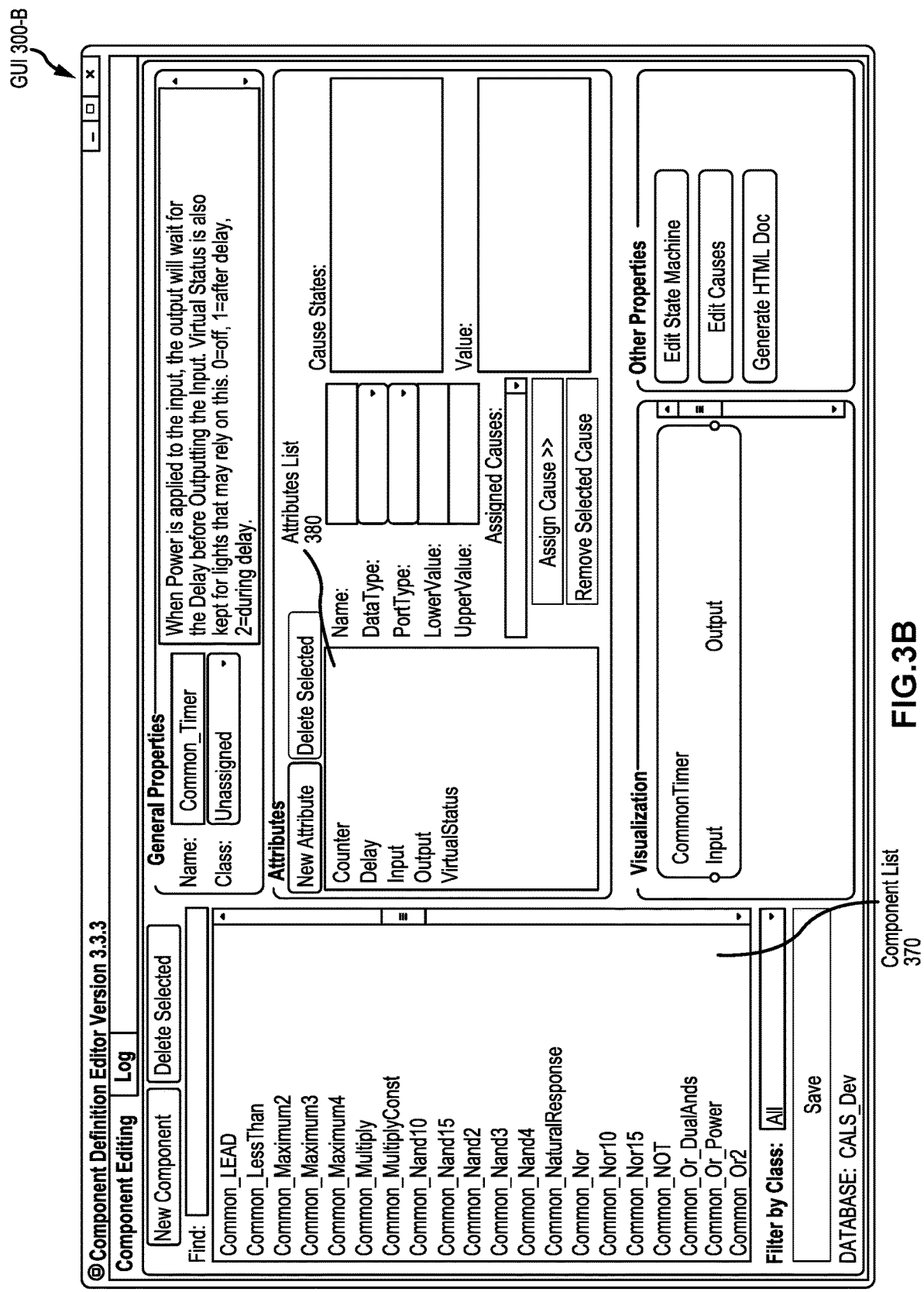
FIG. 3B is a screen capture of a GUI of a component "picker" menu, according to an embodiment.

FIG. 3B is a screenshot of a GUI 300-B, showing an example of a component "picker" menu, according to an embodiment. Here, a user may select the component from a component list 370 (populated by retrieving corresponding data structures for the components stored in the production database 270) or create a new component. As previously indicated, components may comprise one or more attributes, which are shown in the GUI 300-B in the attributes list 380. Using the GUI 300-B, a user may create a new attribute and/or amend an existing attribute of a component. A user may additionally select a visualization for the component (e.g., to be used in the GUI 300-A of FIG. 3A), create a state machine to govern component behavior, specify attribute values, and the like, as illustrated in FIG. 3B.

Referring again to FIG. 3A, the interaction of components can be defined in the graphical layout 330 by connecting the various corresponding component blocks 340. In the example illustrated in FIG. 3A, three outputs 350-1 of a first component block 340-1 (representing a first valve) are connected to inputs 360-2 of a second component block 340-2 (representing a second valve), and an output 350-2 of the second component block 340-2 is connected to an input 360-3 of a third component block 340-3 (representing an alarm). The types of inputs 360 and outputs 350 of various component blocks 340 may be defined as attributes in the respective data structures of the component blocks 340. By interacting with the GUI 300-A (e.g., using a mouse, touchscreen, keyboard, etc.), a user may manipulate the component blocks 340 within the graphical layout 330 and link outputs 350 to inputs 360 and ultimately define simulation models that can be used in the IVE, without a technical knowledge of computer programming, database design, etc.

Referring again to FIG. 2, instructional data management tool(s) 220 may comprise tools for managing how learning objectives are taught and presented in the IVE. In particular, these tools may be used to identify the learning objectives and dictate the various types of learning levels or sessions that appear in the IVE. Additionally or alternatively, instructional data management tool(s) 220 may provide for the creation of test questions regarding the learning objectives and/or the generation of reports that list the test questions.

Figure 6:
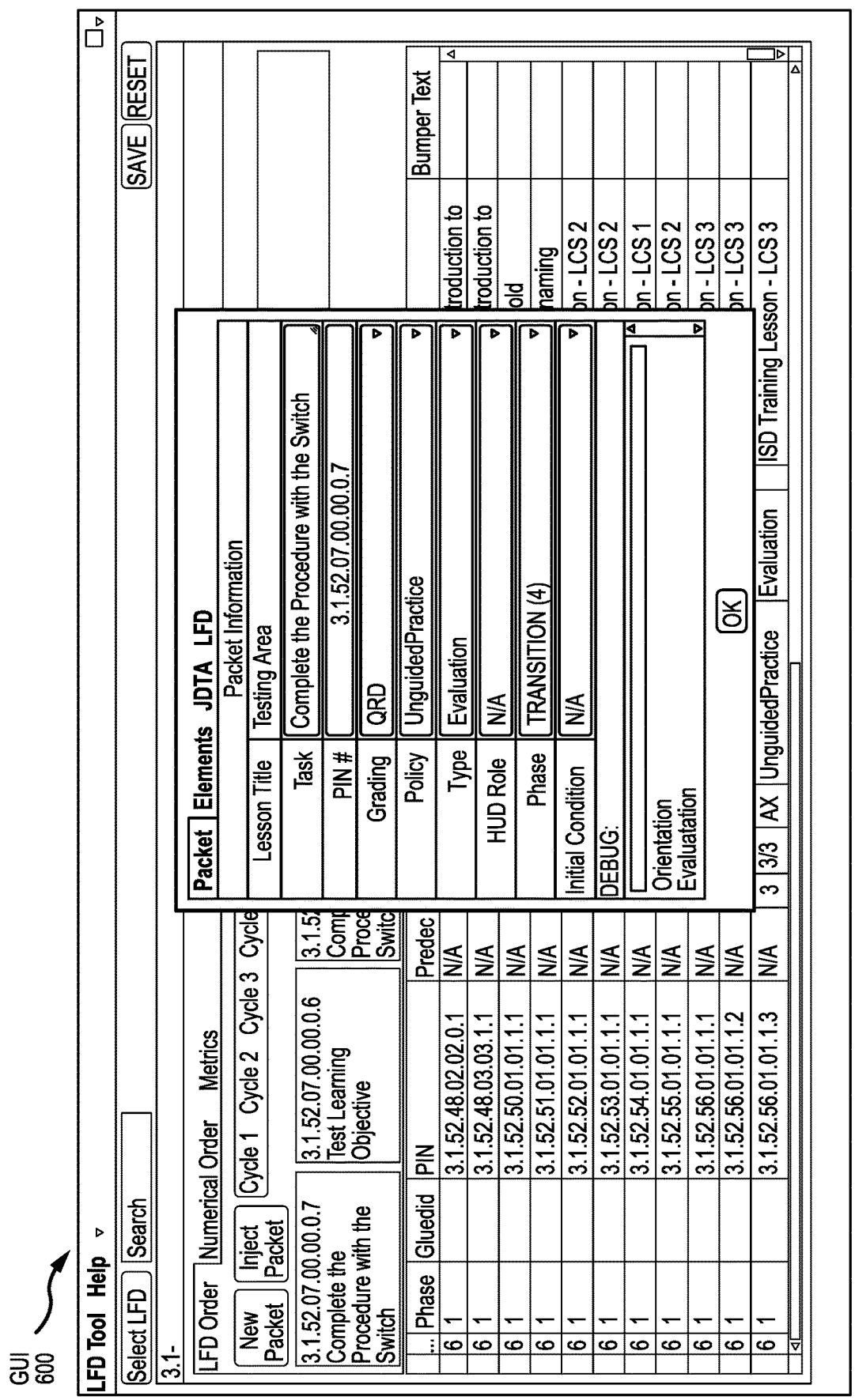

In some embodiments, instructional data management tool(s) 220 may comprise tools for enabling a user to add sessions to the instructional data accessible to students in the IVE. The user interface may further enable a user to dictate an order of the sessions, as well as various aspects of the sessions, including a type of learning (e.g. guided, unguided, evaluation, etc.), amount of repetition, grading, and more. In some embodiments, the instructional data management tool 220 may retrieve, from the production database 270, a previously-defined procedural task associated with one or more components (either or both of which may have been previously defined by other IVE tools 130, as described above) to be completed in a session. An example of such an instructional data management tool 220 is illustrated in FIG. 6 and described below.

Finally, integration tool(s) 260 may be used to tie together and/or build upon various data created by the other IVE tools 130.

Figure 7A:
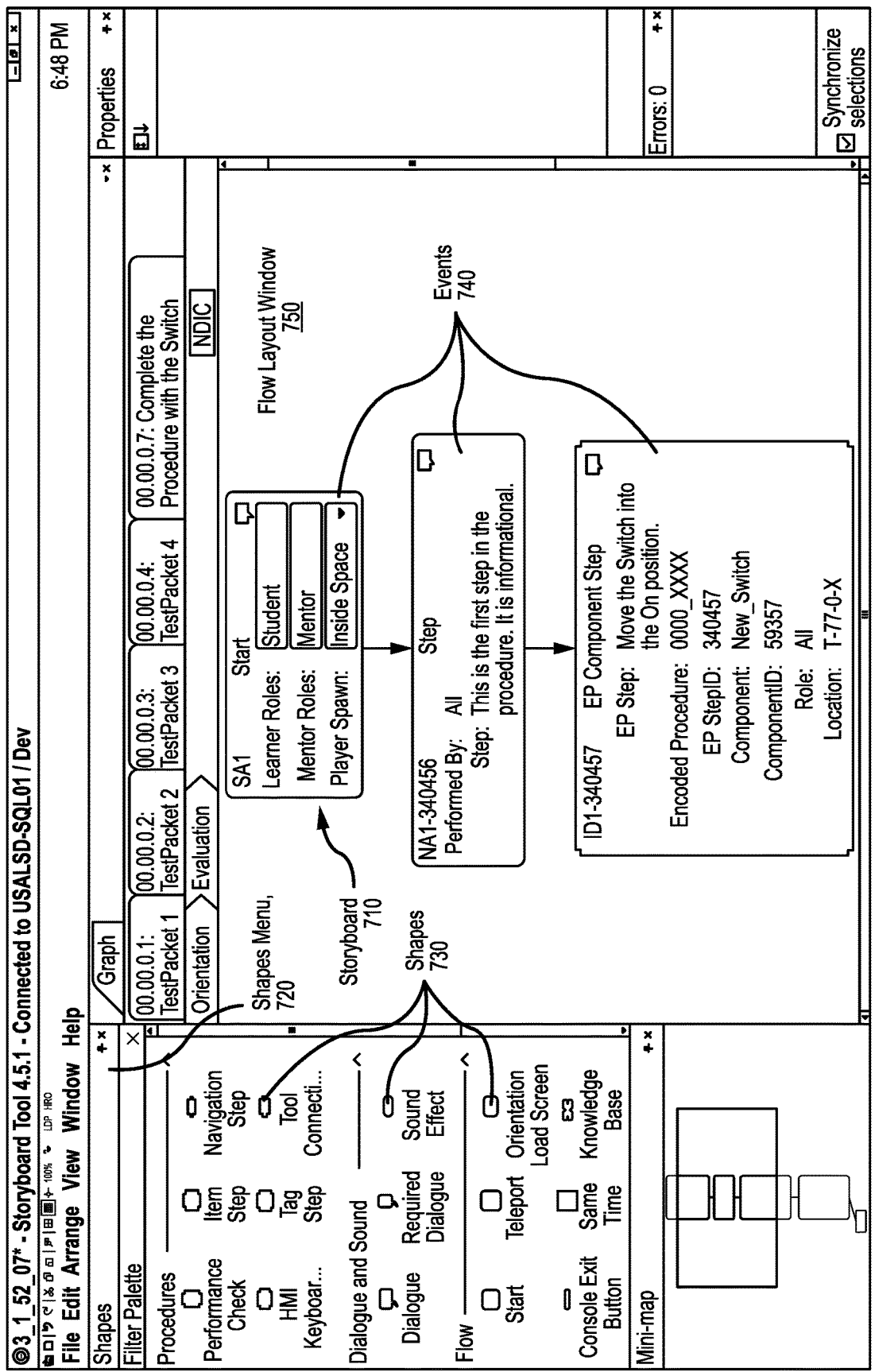
Figure 7B:
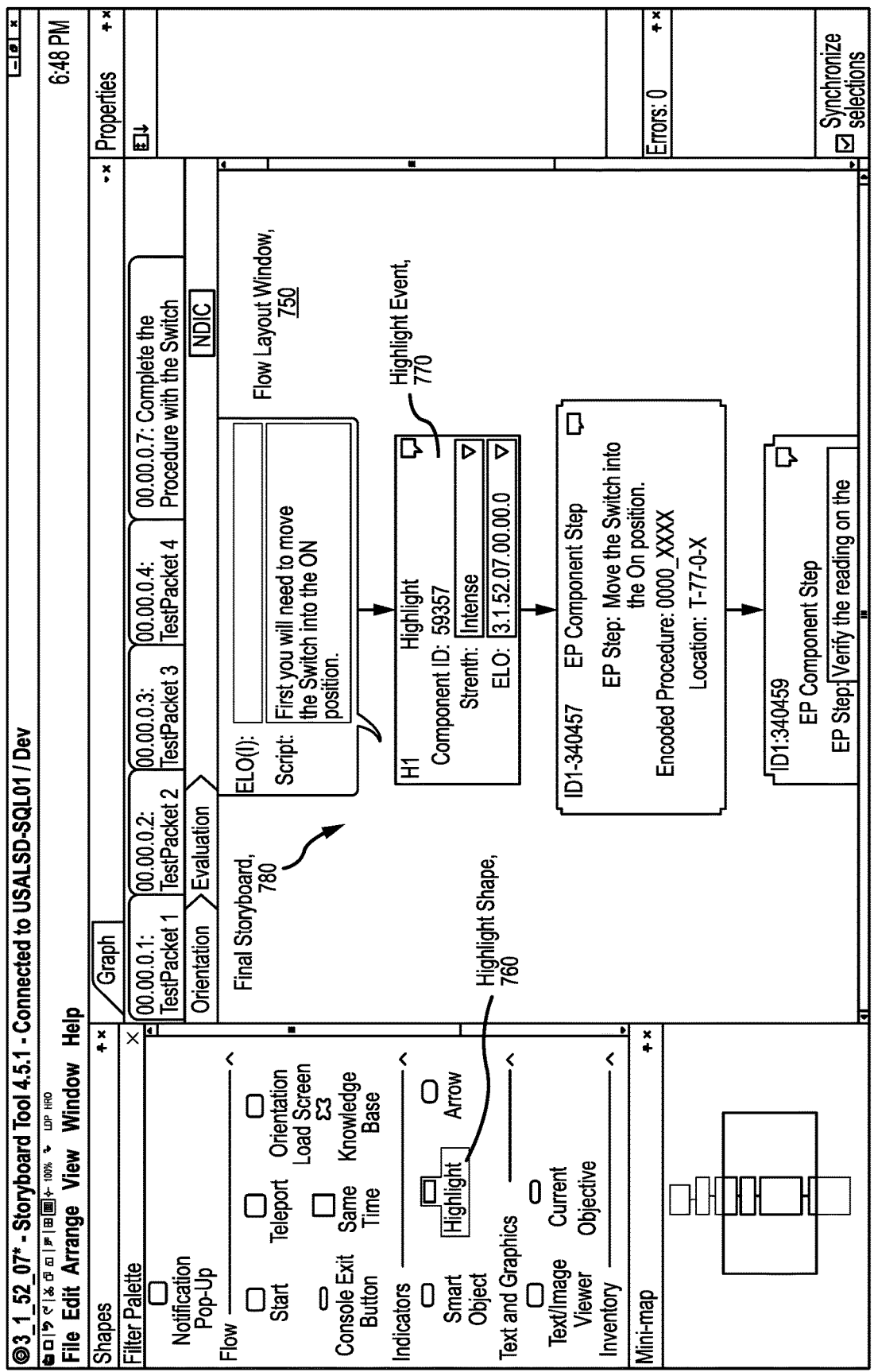

In some embodiments, integration tool(s) 220 may comprise a tool that enables users to draft "scripts" for the various sessions of the instructional content available within the IVE. As previously indicated, instructional data management tool(s) 220 may enable users to define the various sessions of instructional data to be presented within the IVE. A script for each of these sessions may then be defined by integration tool(s) 220, which may provide a simplified user interface that allows users to select various procedures, components, and/or other items to be used within the sessions to create a script (e.g., in the form of an XML file) that defines a storyboard, or flow of events, for each session. Each script may be used by the simulation game engine 150 at runtime. An example of such an integration tool 220 is illustrated in FIGS. 7A and 7B and described below.

In some embodiments, integration tool(s) 220 may comprise a tool that enables users to view slides (or images) of instructional content within the IVE. Such an integration tool 220 may comprise a What You See Is What You Get (WYSIWYG) editor that outputs an XML file executable at runtime, enabling the slides to be viewable within the IVE. Such slides can include, for example, in-game slide shows, help menus, and the like.

As described herein above, the use of a centralized production database 270 by the IVE tools 130 can provide for a data flow within the IVE production process that can help ensure efficiency, reduce data duplication and errors, and provide accessible, user-friendly content generation for non-technical users. Moreover, because tools are not project specific, they can be reused, which, along with the previously-described advantages, can provide for scalability and/or speed beyond traditional IVE production techniques.

FIGS. 4-7B are screenshots of GUIs of various IVE tools 130 provided to help illustrate aspects of the data flow of an embodiment. It will be understood that alternative embodiments may employ different GUIs and/or may vary in the functionality of the IVE tools utilized. A person of ordinary skill in the art will recognize and appreciate such variations.

Figure 4:
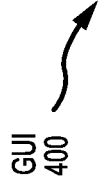

FIG. 4 is a screenshot of a GUI 400 of a first utility tool in which a user can define a component (an interactive object within the IVE) and save it (or, more accurately, a respective data structure of the component) to the production database 270. As illustrated, the GUI 400 allows a user to enter a name for the component and associate it with a definition ("Switch_Dimmer") (e.g., a component type), a location ("T-77-0-X: Feature Test"), and system ("Placeholder") within the IVE. The GUI 400 further allows a user to associate the component with one or more procedures ("0000 XXXX 01062016"), lessons ("3.1.5 2.07—Testing Area"), signals, and/or tools within the IVE.

Figure 5:
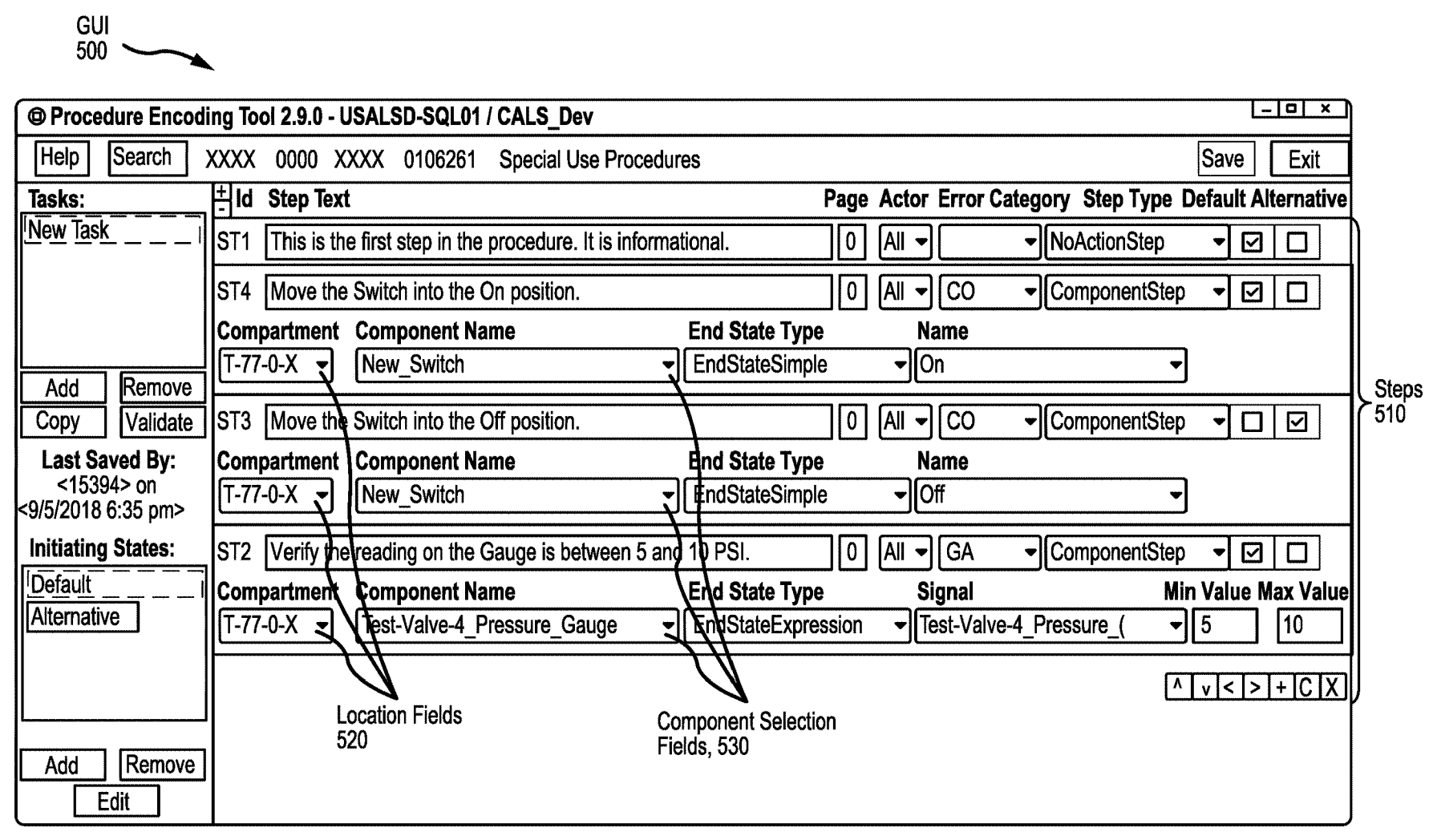

FIG. 5 is a screenshot of a GUI 500 of a second utility tool 250 in which a user is able to define a procedural task ("New Task") having a plurality of steps 510. Here, any of a variety of components at a selected location may be selected for a particular step by selecting the location using the location fields 520 and then selecting the component using the component selection fields 530. In FIG. 5, the component ("New_Switch") created in the GUI 400 of FIG. 4 is selected for the procedural task ("New Task") being created. Once saved, the procedural task will be saved to the production database 270.

The procedural task may involve changing the value of an attribute of a component from one step 510 to another. In the GUI 500 illustrated in FIG. 5, for example, once the component ("New_Switch") is selected using the component selection fields 530, an attribute ("EndStateSimple") for the selected component may then be selected using the attribute selection fields 540, and different values for the attribute may be entered into the attribute value fields 550, representing a change in the value of the attribute from one step to another.

Although not illustrated in FIG. 5, the GUI 500 may provide for any of a variety of types of steps (indicated as "Step Type" in FIG. 5) that may or may not involve a particular component. Additionally, the GUI 500 may accommodate these different step types by having different fields from which components are actions may be selected. For example, one step type may involve an "Item Retrieval" in which the procedural task involves retrieving of particular item. The GUI 500 may then provide options to allow a user to select an item to be retrieved from a drop-down box. Other step types may involve yet other options and/or configurations, as desired.

FIG. 6 is a screenshot of a GUI 600 in which an instructional data management tool is used to create an instructional session (or "packet") for a learning objective for completing a procedure that uses a component (e.g., the "New_Switch" created in the GUI 400 of FIG. 4). As previously indicated, instructional data management tools can not only indicate an order of the sessions, but they can additionally or alternatively define various aspects of the sessions. As indicated in the GUI 600 of FIG. 6, such aspects can include a lesson title, task description, policy, type, and the like. Using the GUI 600, a user can order a simulation into meaningful units (e.g. sessions) of instruction.

FIGS. 7A-7B are screenshots of a GUI 700 of an integration tool in which a user can create storyboard 710 representing an event flow of actual instruction provided in an instructional session defined in the GUI 600 of FIG. 6. The GUI 700 of the integration tool is a visual editor that can help a user determine how to lead a student through a procedure, whether to test the student afterword, and the like. To do so, the GUI 700 can allow a user to include instructional cues, manage event flow, visually highlight components, and more.

Here, the GUI 700 includes a shapes menu 720 from which a user can select any of a variety of shapes 730 to include in the storyboard 710 (e.g., by dragging shapes 730 from the shapes menu 720 and dropping them into the events 740 shown in the flow layout window 750). (To avoid clutter, only a few shapes 730 are labeled.) The shapes 730 representative of procedural tasks (e.g., as defined in the GUI 500 of FIG. 5), components (e.g., as defined in the GUI 400 of FIG. 4), and other items that can be used in the various events 740 of the storyboard 710. Shapes 730 may also represent functions that may be used in the instructional session provided in the IVE, such as adding dialogue and sound, altering flow, providing indicators, inserting text and graphics, and the like.

One such example is the "highlight" indicator function. In FIG. 7B, for example, a highlight shape 760 is dragged into the flow layout window 750 to create a highlight of an event 770 in a final storyboard 780. To highlight an event 770, the user can select a component via picker to highlight (here, the "New_Switch" created in the GUI 400 of FIG. 4). The resulting final storyboard 780 can then include an instructional set of data in which students are instructed how to complete a procedural task within the IVE, where both the procedural task and a component used in the procedural task may have been previously defined by other IVE tools. Once complete, the final storyboard 780 can then be exported to XML and executed by the simulation game engine 150 at runtime.

Figure 8:
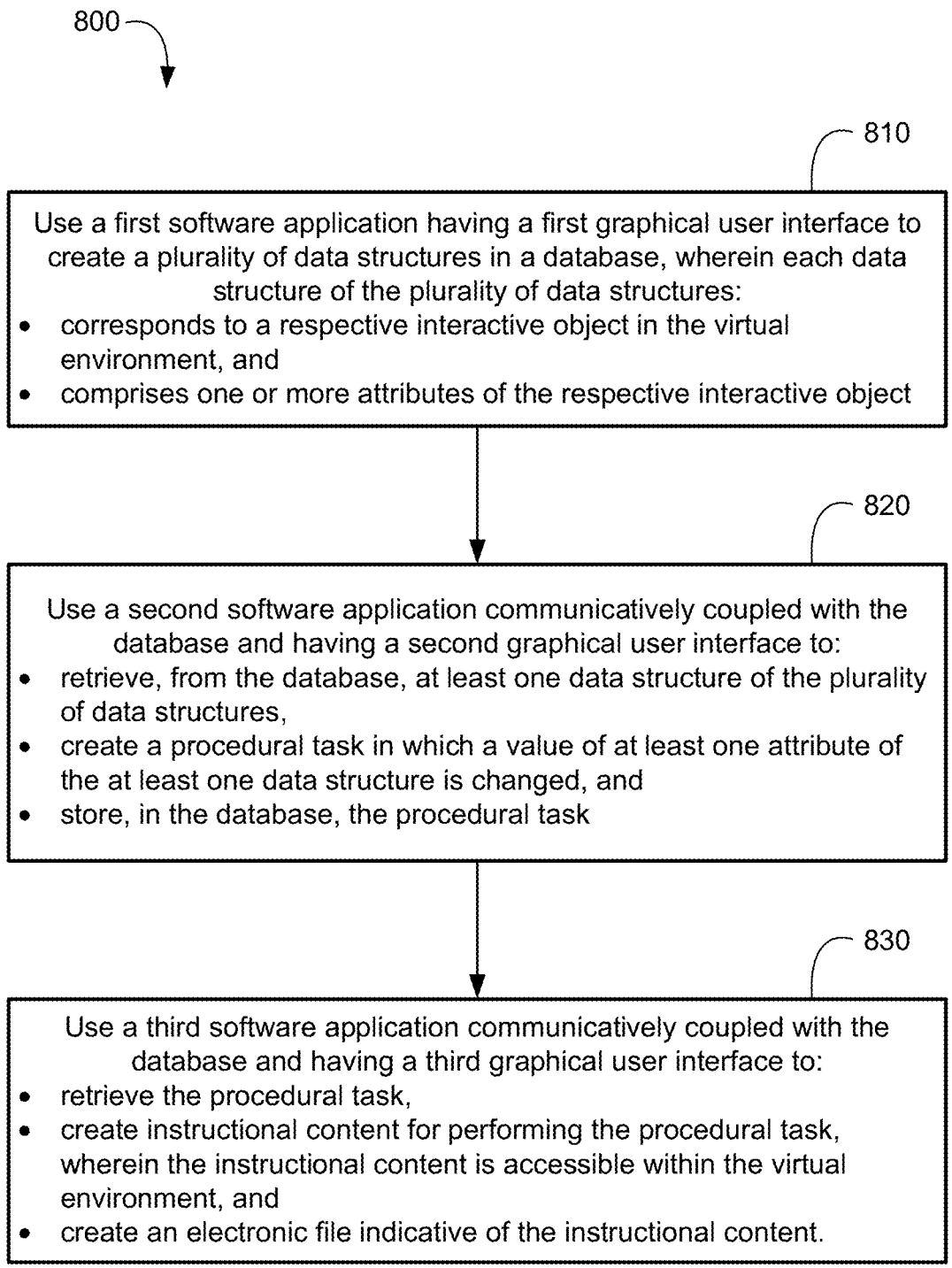
FIG. 8 is a flow diagram of a method 800 of creating content for a virtual environment, according to an embodiment.

FIG. 8 is a flow diagram of a method 800 of creating content for virtual environment, according to an embodiment. Means for performing the functionality of one or more of the blocks of the method 800 may comprise hardware and/or software means of one or more computer systems, such as the computer system 900 illustrated in FIG. 9 and described in more detail below.

As with other figures, FIG. 8 is provided as a non-limiting example. Alternative embodiments may combine, separate, rearrange, add to, omit, and/or otherwise alter the functions illustrated in FIG. 8. A person of ordinary skill in the art would recognize such alterations.

The method may start at block 810, where a first software application having a first graphical user interface is used to create a plurality of data structures in a database, where each data structure of the plurality of data structures corresponds to a respective interactive object in the virtual environment, and comprises one or more attributes of the respective interactive object. As described in the embodiments above, for example, a utility tool 250 may be used to define data structures in a production database 270 representative of interactive objects (i.e., components) in the IVE. A user may use a graphical user interface (e.g., GUI 400 of FIG. 4) of the utility tool 250 to define one or more attributes of the data structure and save the data structure to the production database 270. The one or more attributes of the data structure may comprise one or more fields representative of a status or behavior of the respective component. For example, a data structure representing a switch may have a "status" attribute and a value of the status attribute may be "on" or "off" In some embodiments, these values may be defined by the first software application or another IVE tool. Put more broadly, embodiments of the method 800 may comprise defining, for each data structure of the plurality of data structures, one or more states of the one or more attributes of the respective data structure. Additionally or alternatively, attributes may indicate a location of a respective interactive object within the simulated virtual environment.

In some embodiments, the first software application with the first graphical user interface may be used to create data structures for features in the simulated virtual environment other than interactive objects. With this in mind, embodiments of the method 800 may further comprise using the first software application having the first graphical user interface to create a plurality of additional data structures in the database, where each data structure of the plurality of additional data structures corresponds to a respective additional feature of the simulated virtual environment. Each additional feature comprising a player character, a non-player character, a location, a photo reference, or a course learning objective, or any combination thereof.

At block 820, the functionality comprises using a second software application communicatively coupled with the database and having a second graphical user interface. Here, at least data structure of the plurality of data structures is retrieved from the database, a procedural task is created in which a value of at least one attribute of the at least one data structure is changed, and the procedurals task is stored in the database. As indicated in the GUI 500 of FIG. 5, a procedural task may be defined in a utility tool (separate from the utility tool in which the data structure for the component was created), and the procedural task can involve changing a value of an attribute (e.g. changing the status of a switch from "on" to "off"). In some embodiments, the second user interface may comprise a selectable menu populated by the one or more attributes of the at least one data structure. As described herein, this functionality of populating menus with information (e.g., one or more attributes) directly from the database can help reduce errors and data duplication.

The functionality of block 830 comprises using a third software application communicatively coupled with the database and having a third graphical user interface to retrieve the procedural task related to the at least one data structure, create instructional content for performing the procedural task, wherein the instructional content is accessible within the virtual environment, and create an electronic file indicative of the instructional content. As indicated in the embodiments described previously, instructional content may comprise instructions provided within the virtual environment for teaching a student how to perform the procedural task. As noted in the example illustrated in FIGS. 4-7B, a GUI 700 of an integration tool a be used to create a flow of events (the final storyboard 780) in which instructions are provided for performing a previously-defined procedural task (e.g. as created in the GUI 500 of FIG. 5). Moreover, the integration tool may utilize drag-and-drop functionality to facilitate the creation of the flow of events by a non-technical user. As such, according to some embodiments of the method 800, the instructional content may comprise a flow of events, and the third graphical user interface enables a user to create the instructional content, at least in part, by dragging an icon representative of the procedural task and placing it within a graph representative of the flow of events. Optionally, the third graphical user interface further enables a user to highlight, in the simulated virtual environment, a respective at least one interactive object of the at least one data structure. Moreover, in some embodiments, an integration tool may include a "picker" menu listing components and/or other items created by the IVE tools. As such, in some embodiments of the method 800, the third graphical user interface may further enable the user to select the at least one data structure from a menu listing the plurality of data structures, and the third software application populates the menu by retrieving, from the database, a list of the plurality of data structures.

Depending on desired functionality, the method 800 may include one or more additional features. For example, in some embodiments, the method 800 may further comprise using a fourth software application having a fourth graphical user interface to create a simulation model that defines how a first interactive object in the simulated virtual environment interacts with a second interactive object in the simulated virtual environment, wherein creating the simulation model comprises retrieving, from the database, information from respective data structures of each of the first interactive object and the second interactive object. An example of such functionality as illustrated in the GUI 300-A of FIG. 3A, where a simulation model editor allows a user to define interactions between various components.

As previously indicated, IVE tools may include tools for creating and managing user profiles. As such, embodiments of the method 800 may comprise creating an authorization profile for a user, wherein the authorization profile dictates whether the user is able to use the first software application, the second software application, or the third software application, or any combination thereof.

Figure 9:
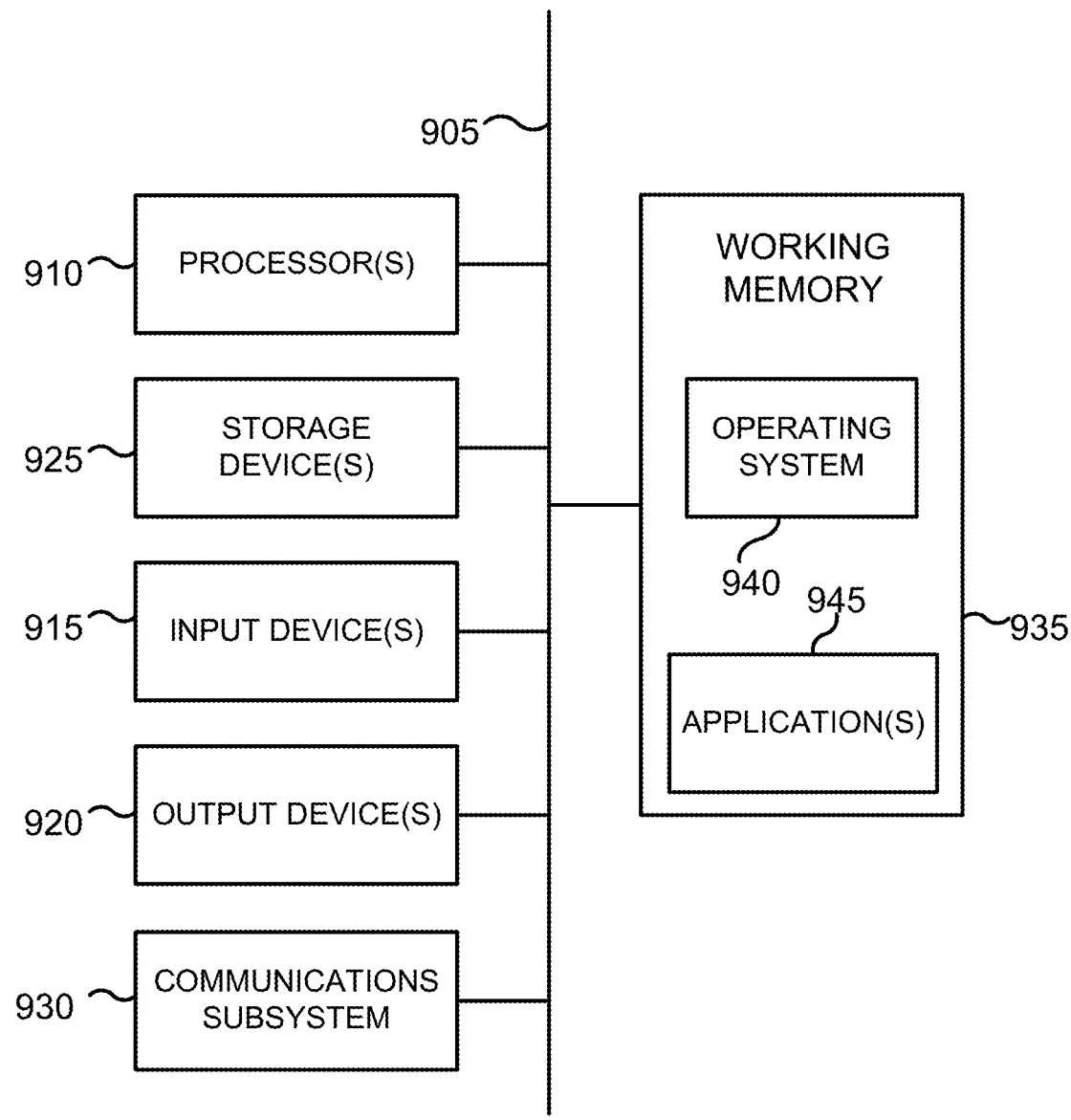
FIG. 9 is a simplified block diagram of a computer system, according to an embodiment.

FIG. 9 is a simplified block diagram of a computer system 900, according an embodiment. A computer system 900 as illustrated in FIG. 9 may, for example, execute software applications corresponding to one or more IVE tools 130, the simulation game engine 150, production database 270, and/or user-facing product 160 illustrated in FIG. 1. FIG. 9 provides a schematic illustration of one embodiment of a computer system 900 that can perform some or all of the steps of the methods provided by various embodiments. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905, or may otherwise be in communication, as appropriate. The hardware elements may include one or more processors 910, including without limitation one or more general-purpose processors (e.g., CPUs) and/or one or more special-purpose processors such as digital signal processing chips, graphics acceleration processors (e.g., GPUs), and/or the like; one or more input devices 915, which can include without limitation a mouse, a keyboard, a camera, and/or the like; and one or more output devices 920, which can include without limitation a display device, a printer, and/or the like.

The computer system 900 may further include and/or be in communication with one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 900 might also include a communication interface 930, which can include without limitation a modem, a network card (wireless or wired), an infrared communication device, a wireless communication device, and/or a chipset, and/or the like. The communication interface 930 may include one or more input and/or output communication interfaces to permit data to be exchanged with other computer systems, cameras, HMDs, and/or any other devices described herein.

The computer system 900 also can include software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, all or part of one or more procedures described with respect to the methods discussed above, and/or methods described in the claims, might be implemented as code and/or instructions executable by a computer and/or a processor within a computer. In an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 925 described above. In some cases, the storage medium might be incorporated within a computer system, such as computer system 900. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 900 to perform methods in accordance with various embodiments of the technology. According to a set of embodiments, some or all of the procedures of such methods are performed by the computer system 900 in response to processor(s) 910 executing one or more sequences of one or more instructions, which might be incorporated into the operating system 940 and/or other code, such as an application program 945, contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 925. Volatile media include, without limitation, dynamic memory, such as the working memory 935.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communication interface 930 and/or components thereof generally will receive signals, and the bus 905 then might carry the signals and/or the data, instructions, etc. carried by the signals to the working memory 935, from which the processor(s) 910 retrieves and executes the instructions. The instructions received by the working memory 935 may optionally be stored on a non-transitory storage device 925 either before or after execution by the processor(s) 910.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups. As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A method of creating content for a virtual environment, the method comprising:
   using a first software application having a first graphical user interface to create a plurality of data structures in a database, wherein each data structure of the plurality of data structures:
   corresponds to a respective interactive object in the virtual environment; and
   comprises one or more attributes of the respective interactive object;
   using a second software application communicatively coupled with the database and having a second graphical user interface to:
   retrieve, from the database, at least one data structure of the plurality of data structures;
   create a procedural task in which a value of at least one attribute of the at least one data structure is changed; and
   store, in the database, the procedural task; and
   using a third software application communicatively coupled with the database and having a third graphical user interface to:
   retrieve the procedural task;
   create instructional content for performing the procedural task, wherein:
   the instructional content comprises a flow of events,
   the third graphical user interface (1) enables a user to create the instructional content, at least in part, by dragging an icon representative of the procedural task and placing it within a graphical representation of the flow of events, and (2) allows a user to insert one or more instructional cues for performing the procedural task into the instructional content, and the instructional content is accessible within the virtual environment; and create an electronic file indicative of the instructional content.

2. The method of claim 1, wherein the second graphical user interface comprises a selectable menu populated by the one or more attributes of the at least one data structure.

3. The method of claim 1, further comprising using a fourth software application having a fourth graphical user interface to create a simulation model that defines how a first interactive object in the virtual environment interacts with a second interactive object in the virtual environment, wherein creating the simulation model comprises retrieving, from the database, information from respective data structures of each of the first interactive object and the second interactive object.

4. The method of claim 1, further comprising defining, for each data structure of the plurality of data structures, one or more states of the one or more attributes of the respective data structure.

5. The method of claim 1, further comprising creating an authorization profile for a user, wherein the authorization profile indicates whether the user is authorized to use the first software application, the second software application, or the third software application, or any combination thereof.

6. The method of claim 1, wherein one or more attributes of each data structure of the plurality of data structures further comprises information indicative of a location of the respective interactive object within the virtual environment.

7. The method of claim 1, wherein the third graphical user interface further enables a user to highlight, in the virtual environment, a respective at least one interactive object of the at least one data structure.

8. The method of claim 1, wherein: the third graphical user interface further enables the user to select the at least one data structure from a menu listing the plurality of data structures; and the third software application populates the menu by retrieving, from the database, a list of the plurality of data structures.

9. The method of claim 1, further comprising using the first software application having the first graphical user interface to create a plurality of additional data structures in the database, wherein each data structure of the plurality of additional data structures corresponds to a respective additional feature of the virtual environment, each additional feature comprising:

a player character, a non-player character, a location, a photo reference, or a course learning objective, or any combination thereof.

10. A non-transitory computer-readable medium having instructions embedded thereon for creating content for a virtual environment, wherein the instructions, when executed by one or more computer systems, cause the one or more computer systems to:

provide a first graphical user interface configured to enable the creation of a plurality of data structures in a database, wherein each data structure of the plurality of data structures:

corresponds to a respective interactive object in the virtual environment; and comprises one or more attributes of the respective interactive object;

provide a second graphical user interface configured to enable:

retrieval, from the database, of at least one data structure of the plurality of data structures;

creation of a procedural task in which a value of at least one attribute of the at least one data structure is changed; and storing, in the database, of the procedural task; and provide a third graphical user interface configured to enable:

retrieval of the procedural task;

creation of instructional content for performing the procedural task, wherein:

the instructional content comprises a flow of events, the third graphical user interface (1) enables a user to create the instructional content, at least in part, by dragging an icon representative of the procedural task and placing it within a graphical representation of the flow of events, and (2) allows a user to insert one or more instructional cues for performing the procedural task into the instructional content, and the instructional content is accessible within the virtual environment; and creation of an electronic file indicative of the instructional content.

11. The non-transitory computer-readable medium of claim 10, wherein the second graphical user interface comprises a selectable menu populated by the one or more attributes of the at least one data structure.

12. The non-transitory computer-readable medium of claim 10, wherein the instructions, when executed by one or more computer systems, further cause the one or more computer systems to provide a fourth graphical user interface configured to enable the creation of a simulation model that defines how a first interactive object in the virtual environment interacts with a second interactive object in the virtual environment, wherein the creation of the simulation model comprises retrieving, from the database, information from respective data structures of each of the first interactive object and the second interactive object.

13. The non-transitory computer-readable medium of claim 10, wherein the instructions, when executed by one or more computer systems, further cause the one or more computer systems to define, for each data structure of the plurality of data structures, one or more states of the one or more attributes of the respective data structure.

14. The non-transitory computer-readable medium of claim 10, wherein the instructions, when executed by one or more computer systems, further cause the one or more computer systems to create an authorization profile for a user, wherein the authorization profile indicates whether the user is authorized to use the first graphical user interface, the second graphical user interface, or the third graphical user interface, or any combination thereof.

15. The non-transitory computer-readable medium of claim 10, wherein one or more attributes of each data structure of the plurality of data structures further comprises information indicative of a location of the respective interactive object within the virtual environment.

16. The non-transitory computer-readable medium of claim 10, wherein the instructions, when executed by one or more computer systems, further cause the one or more computer systems to cause the third graphical user interface to further enable a user to highlight, in the virtual environment, a respective at least one interactive object of the at least one data structure.

17. The non-transitory computer-readable medium of claim 10, wherein the instructions, when executed by one or more computer systems, further cause the one or more computer systems to:
- cause the third graphical user interface to enable the user to select the at least one data structure from a menu listing the plurality of data structures; and
- populate the menu by retrieving, from the database, a list of the plurality of data structures.

18. The non-transitory computer-readable medium of claim 10, wherein the instructions, when executed by one or more computer systems, further cause the one or more computer systems to create, using the first graphical user interface, a plurality of additional data structures in the database, wherein each data structure of the plurality of additional data structures corresponds to a respective additional feature of the virtual environment, each additional feature comprising:
- a player character,
- a non-player character,
- a location,
- a photo reference, or
- a course learning objective, or
- any combination thereof.

\* \* \* \* \*